United States Patent Office 3,594,318
Patented July 20, 1971

---

3,594,318
ANTIOXIDANT COMPOSITIONS
James D. O'Neill, Southfield, Mich., assignor to Ethyl Corporation, New York, N.Y.
No Drawing. Filed May 12, 1969, Ser. No. 823,971
Int. Cl. C10m 1/12, 1/38
U.S. Cl. 252—46.4                      10 Claims

ABSTRACT OF THE DISCLOSURE

Organic material is synergistically stabilized by addition of both an α-alkoxy dihydrocarbyl cresol and a dialkyl tin sulfide synergist. For example, lubricating oil containing α-alkoxy-2,6-di-tert-butyl-p-cresol and dibutyl tin sulfide is exceptionally stable.

BACKGROUND

Alpha-alkoxy dihydrocarbyl cresols are known antioxidants. They are described in U.S. 2,838,571, U.S. 2,954,345 and in British Pat. 822,693. Also, dialkyl tin sulfides have been used in lubricating oil primarily as wear additives, as shown in U.S. 3,077,451. However, it has never been appreciated in the past that a synergistic antioxidant effect would occur if these two types of additives are used in concert.

SUMMARY

It has now been found that organic material is synergistically stabilized by inclusion of the combination of an α-alkoxy dihydrocarbyl cresol and a dialkyl tin sulfide. The stabilizing effect is much greater than what can be attributed to either individual additive. The combination is especially useful in lubricating oils.

DESCRIPTION OF THE PREFERRED EMBODIMENTS

In a preferred embodiment the synergistic combination added to an organic material consists essentially of a dialkyl tin sulfide and a phenolic antioxidant having the formula:

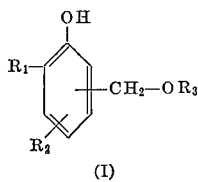

(I)

wherein $R_1$ is selected from the group consisting of alpha-branched alkyl radicals containing 3–20 carbon atoms, cycloalkyl radicals containing 6–20 carbon atoms and alpha-branched aralkyl radicals containing 8–20 carbon atoms, $R_2$ is selected from the group consisting of alkyl radicals containing 1–20 carbon atoms, cycloalkyl radicals containing 6–20 carbon atoms and aralkyl radicals containing 7–20 carbon atoms, and $R_3$ is an alkyl radical containing from 1 to about 50 carbon atoms.

Some examples of these phenolic antioxidants are:

α-methoxy-4,6-di-tert-butyl-o-cresol
α-decyloxy-4-methyl-6-isopropyl-o-cresol
α-dodecyloxy-4,6-di-tert-amyl-o-cresol
α-eicosyloxy-4,6-di-sec-dodecyl-o-cresol
α-triacontyloxy-4-methyl-6-sec-eicosyl-o-cresol
α-tetracontyloxy-4,6-dicyclohexyl-o-cresol
α-pentacontyloxy-4-methyl-6-(4-tert-butylcyclohexyl)-o-cresol
α-methoxy-2-(4-sec-tetradecylocyclohexyl)-6-methyl-p-cresol
α-isooctyloxy-2,6-di-(α-methylbenzyl)-p-cresol
α-n-decyloxy-2-(α,α-dimethylbenzyl)-6-methyl-p-cresol
α-n-dodecyloxy-2-(α-methyl-4-sec-dodecylbenzyl)-6-tert-butyl-p-cresol
α-isooctyloxy-2-(α,α-dimethyl-4-isodecylbenzyl)-6-cyclohexyl-p-cresol
α-n-eicosyloxy-2-tert-butyl-6-benzyl-p-cresol In a more preferred embodiment the phenolic antioxidant has the formula:

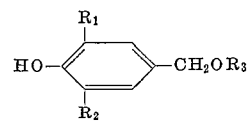

(II)

in which $R_1$, $R_2$ and $R_3$ are the same as above.

Examples of this class of compounds are:

α-methoxy-2-methyl-6-tert-butyl-p-cresol
α-ethoxy-2,6-diisopropyl-p-cresol
α-hexoxy-2,6-di-tert-amyl-p-cresol
α-decyloxy-2,6-di-sec-butyl-p-cresol
α-dodecyloxy-2-tert-dodecyl-6-methyl-p-cresol
α-octadecyloxy-2-tert-tetradecyl-6-methyl-p-cresol
α-eicosyloxy-2-tert-eicosyl-6-methyl-p-cresol
α-docosyloxy-2,6-dicylohexyl-p-cresol
α-triacontyloxy-2,6-di-(1-methylcyclohexyl)-p-cresol
α-pentacontyloxy-2,6-di-(4-tert-butylcyclohexyl)-p-cresol
α-dodecyloxy-2-methyl-6-(sec-tetradecylcyclohexyl)-p-cresol
α-methoxy-2,6-di-(α-methylbenzyl)-p-cresol
α-sec-decyloxy-2-(α,α-dimethylbenzyl)-6-methyl-p-cresol
α-sec-dodecyloxy-2,6-di-(α-methyl-4-n-dodecylbenzyl)-p-cresol In an especially preferred embodiment the phenolic antioxidant is a normally liquid mixture of α-alkoxy-3,5-dialkyl-p-cresols, said mixture consisting essentially of compounds having the formula:

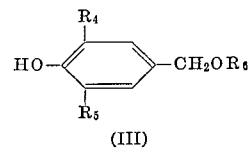

(III)

wherein $R_4$ and $R_5$ are tert-alkyl radicals, preferably those containing 4 to about 12 carbon atoms, and $R_6$ is an alkyl radical containing from about 8–14 carbon atoms in proportion such that from 0–5 weight percent are octyl radicals, from 40–85 weight percent are decyl radicals, from 10–50 weight percent are dodecyl radicals, and from 0–5 weight percent are tetradecyl radicals and at least 50 weight percent of said octyl, decyl, dodecyl and tetradecyl radicals, collectively, are linear primary alkyl radicals.

A feature of using this liquid form of the phenolic antioxidant is that it permits the pre-blending of the phenolic antioxidant with the dialkyl tin sulfide prior to adding the synergistic mixture to the organic material to be protected. This is a very convenient method to handle the addition of the tin compound to the organic material.

The liquid phenolic antioxidant used in this invention can be made by a variety of methods. One such method is the reaction of the appropriate 2,6-dialkylphenol with formaldehyde and a mixture of alcohols containing from about 8–14 carbon atoms in the ratio of about 0–5 weight percent octyl alcohols, 40–85 weight percent decyl alcohols, 10–50 weight percent dodecyl alcohols, and 0–5 weight percent tetradecyl alcohols. At least 50 weight percent of the alcohols in the mixture are linear primary alcohols. The reaction is catalyzed by a base such as potassium hydroxide. The essential features of this method are described in U.S. 2,838,571 and U.S. 2,954,345, incorporated herein by reference.

Another method is to react the appropriate 3,5-dialkyl-4-hydroxybenzyl halide with the above mixture of octyl, decyl, dodecyl and tetradecyl alcohols, generally in the presence of a hydrogen halide acceptor such as pyridine or triethylamine.

The preferred method is by the reaction of the appropriate 3,5-dialkyl-4-hydroxybenzyl alcohols with a mixture of hexyl, octyl, decyl, dodecyl and tetradecyl alcohols, as prescribed above. The preferred method of preparing the liquid antioxidants is carried out by mixing a 3,5-dialkyl-4-hydroxybenzyl alcohol with from 1–10 mole equivalents of the aliphatic alcohol mixture in the presence of an acid catalyst at temperatures of from about 50–200° C.

The 3,5-dialkyl-4-hydroxybenzyl alcohols are compounds having the formula:

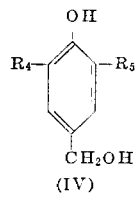

(IV)

wherein $R_4$ and $R_5$ are tertiary alkyl radicals, preferably tertiary alkyl radicals containing from 4 to about 12 carbon atoms. Examples of these reactants are 3,5-di-tert-butyl-4-hydroxybenzyl alcohol, 3,5-di-tert-amyl-4-hydroxybenzyl alcohol, 3-tert-butyl-5-tert-amyl-4-hydroxybenzyl alcohol, 3,5-di-tert-hexyl-4-hydroxybenzyl alcohol, 3,5-di-tert-octyl-4-hydroxybenzyl alcohol, 3,5-di-tert-dodecyl-4-hydroxybenzyl alcohol, and the like.

The alcohol mixture which leads to the liquid phenolic antioxidants is essentially a mixture of octyl, decyl, dodecyl and tetradecyl alcohols. There may be minor amounts of other alcohols present without interfering with the liquid nature of the product. At least 50 weight percent of the alcohols are linear primary alcohols, sometimes referred to as "normal alcohols." Naturally, other inert materials can be present in the alcohols as well as diluents without interfering with the essential features of the invention.

The amount of each alcohol in the mixture can be from 0–5 weight percent octyl alcohol, from 40–85 weight percent decyl alcohol, from 10–50 weight percent dodecyl alcohol, and from 0–5 weight percent tetradecyl alcohol, such that the total alcohols adds up to about 100 percent of the active ingredients. For example, a suitable mixture is:

| | Wt. percent |
|---|---|
| n-Octyl alcohol | 1.0 |
| Isooctyl alcohol | 0.3 |
| n-Decyl alcohol | 68.0 |
| Isodecyl alcohol | 2.0 |
| n-Dodecyl alcohol | 10.0 |
| Isododecyl alcohol | 15.0 |
| n-Tetradecyl alcohol | 0.5 |
| Isotetradecyl alcohol | 2.0 |
| n-Cetyl alcohol | 0.4 |
| Isocetyl alcohol | 0.8 |

From the above description, it can be seen that the principal alcohols used to prepare the liquid products are decyl and dodecyl alcohols and that only minor amounts of the other alcohols are present. Other suitable mixtures can be made by varying the above composition within the prescribed limits.

The ratio of the aliphatic alcohols to the 3,5-dialkyl-4-hydroxybenzyl alcohol should provide at least one mole of aliphatic alcohol per mole of the benzyl alcohol. A useful range is from about 1–10 moles of aliphatic alcohol per mole of 3,5-dialkyl-4-hydroxybenzyl alcohol. A preferred range is from about 1–2 moles of aliphatic alcohol per mole of benzyl alcohol.

Although not required, the reaction is generally run in a solvent. Preferred solvents are hydrocarbons boiling from about 50–200° C. Of these, the more preferred are the aromatic hydrocarbons, especially benzene, toluene, xylene, mesitylene, naphthalene, and the like.

Useful acid catalysts include both mineral and organic acids. Preferred are the mineral acids such as sulfuric, phosphoric, phosphorous, and the like. Especially preferred are the aromatic sulfonic acids such as benzene, sulfonic acid, p-toluene sulfonic acid, and also sulfonated polystyrene acid ion exchange resins.

The amount of catalyst should be enough to catalyze the reaction at a useful rate under the reaction conditions. A useful range is from 0.01 to 10 weight percent, based on the total reaction mixture. A preferred range is from about 0.05 to 3 weight percent.

The product can be recovered by any of the well-known methods. One such method is by distillation. A useful liquid product is readily obtained by merely washing out the acid catalyst and distilling out any solvent together with unreacted alcohol left over. The liquid residue remaining can be used directly as the phenolic antioxidants used in the combinations of this invention.

The following examples will serve to illustrate the preparation of the liquid phenolic antioxidants which can be used in the synergistic combinations of this invention. All parts are by weight unless otherwise specified.

EXAMPLE 1

In a reaction vessel equipped with stirrer and heating means and provided with a nitrogen atmosphere was placed 24 parts of 3,5-di-tert-butyl-4-hydroxybenzyl alcohol, 150 parts of toluene, 0.3 part of p-toluene sulfonic acid and 50 parts of an alcohol mixture consisting essentially of 1 weight percent n-octyl alcohol, 74 weight percent n-decyl alcohol, 2 weight percent of isodecyl alcohol, 10 weight percent n-dodecyl alcohol, 12 weight percent isododecyl alcohol and 1 weight percent isotetradecyl alcohol. The mixture was stirred and heated to reflux and maintained at reflux for 5 hours, during which period water was removed from the distillate using a water separator. Following this, the solution was cooled and washed with water. It was then washed with sodium bicarbonate solution, following which the volatile toluene and unreacted alcohols were distilled out under vacuum until the liquid temperature reached 158° C. at a pressure of less than 0.1 mm. The residue remaining was a free-flowing light amber liquid which was identified by infrared spectrum as an α-alkoxyl-2,6-di-tert-butyl-p-cresol, in which the alkoxy groups were obtained from the alcohol mixture.

It is readily seen that other liquid phenolic anti-oxidants of this invention can be made following the above general procedure by merely substituting a different 3,5-dialkyl-4-hydroxybenzyl alcohol and/or by using other alcohol mixtures within the prescribed limits.

EXAMPLE 2

In the reaction vessel of Example 1 was placed 300 parts of an alcohol mixture consisting essentially of 80 weight percent n-decyl alcohol, 6 weight percent n-dodecyl alcohol, and 14 weight percent isododecyl alcohol. Following this, 50 parts of calcium carbonate was added. While stirring, the mixture was heated to 60° C. and 255 parts of 3,5-di-tert-butyl-4-hydroxybenzyl chloride were added over a 90 minute period. Stirring was continued at 60–75° C. for 6.5 hours. The temperature was raised to 125° C. and stirring continued for 10 hours. The mixture was cooled, diluted with ether, and washed with dilute aqueous hydrochloric acid. The organic layer was then washed with water until neutral, following which it was dried. The ether was distilled out and the mixture filtered. Following this, the remaining volatiles in the filtrate were distilled at 0.5 mm. Hg, up to a vapor temperature of 115° C. The liquid residue remaining was an effective phenolic antioxidant when used in the synergistic combinations of this invention.

Other 3,5-dialkyl-4-hydroxybenzyl halides can be used following the above procedure. For example, 3,5-di-tert-amyl-4-hydroxybenzyl bromide can be employed to give the corresponding mixture of α-alkoxy-2,6-di-tert, amyl-p-cresols. Likewise, the alcohol mixture can be varied within the prescribed limits to give similar liquid phenolic antioxidant products.

EXAMPLE 3

To a reaction vessel as described in Example 1 was added 54 parts of paraformaldehyde, 2.1 parts of potassium hydroxide and 270 parts of an alcohol mixture consisting essentially of 2 weight percent n-octyl alcohol, 80 weight percent n-decyl alcohol, 1 weight percent isodecyl alcohol, 6 weight percent n-dodecyl alcohol, 8 weight percent isododecyl alcohol, 1 weight percent n-tetradecyl alcohol and 2 weight percent isotetradecyl alcohol. Following this, 45 parts of n-decane was added and the mixture heated to 70° C. while stirring. A solution of 570 parts of the above alcohol mixture, 180 parts of 2,6-di-tert butylphenol and 9 parts of potassium hydroxide was prepared and added to the stirred alcohol/paraformaldehyde mixture over an 11 hour period. Stirring at 70° C. was continued and additional potassium hydroxide added in three increments of three parts each during the following 20 hours. The reaction mixture was washed with water and dried over magnesium sulfate. Solvent and excess alcohol were distilled off at 1 mm. Hg at 125° C. The liquid product that remained was identified by gas chromatography as a mixture of α-alkoxy-2,6-di-tert-butyl-p-cresols.

EXAMPLE 4

The procedure of Example 3 was repeated except using an equal mole amount of 2,6-di-tert-dodecylphenol in place of the 2,6-di-tert-butylphenol. The product was a useful antioxidant.

EXAMPLES 5–12

Reactions are carried out following the procedure of Example 1 except using the following alcohol mixtures.

| Example | 5 | 6 | 7 | 8 | 9 | 10 | 11 | 12 |
| --- | --- | --- | --- | --- | --- | --- | --- | --- |
| Alcohol mixture: | | | | | | | | |
| n-Octyl | 0 | 3 | 2 | 2 | 2 | 1 | 4 | 2 |
| i-Octyl | 0 | 2 | 1 | 0.5 | 0 | 0.5 | 1 | 0 |
| n-Decyl | 60 | 25 | 70 | 35 | 80 | 85 | 75 | 65 |
| i-Decyl | 25 | 15 | 15 | 10 | 5 | 0 | 10 | 5 |
| n-Dodecyl | 3 | 25 | 5 | 20 | 3 | 4 | 3 | 10 |
| i-Dodecyl | 7 | 25 | 5 | 30 | 10 | 6 | 7 | 15 |
| n-Tetradecyl | 2 | 3 | 0 | 1 | 0 | 1.5 | 0 | 0 |
| i-Tetradecyl | 3 | 2 | 0 | 1.5 | 0 | 2 | 0 | 3 |

In each case the product is a liquid phenolic antioxidant readily soluble in a wide range of organic substrates. Dialkyl tin sulfides, for example dibutyl tin sulfide, are readily soluble in the liquid phenolic antioxidants forming synergistic additive packages. When these packages are used to add to the organic substrate they generally contain from 1–50 percent dialkyl tin sulfide and the balance the phenolic antioxidant exclusive of any diluents, solvents or other material which might be included in the package.

Dialkyl tin sulfides are compounds having two alkyl groups and a sulfur atom bonded to a thin atom. They generally exist in a trimeric form. Trimeric dialkyl tin sulfides are included within the term dialkyl tin sulfides as used herein. The preferred dialkyl tin sulfides are the di-lower alkyl tin sulfides in which the alkyl radical contains from 1 to about 8 carbon atoms. Examples of these are: dimethyl tin sulfide, diethyl tin sulfide, di-n-propyl tin sulfide, di-isopropyl tin sulfide, di-n-butyl tin sulfide, diisobutyl tin sulfide, di-sec-butyl tin sulfide, di-n-hexyl tin sulfide, di-(3-methylamyl) tin sulfide, di-n-octyl tin sulfide, di-(2-methylheptyl) tin sulfide, methyl ethyl tin sulfide, methyl butyl tin sulfide, and the like. The most preferred dialkyl tin sulfide is di-n-butyl tin sulfide.

The amount of the α-alkoxy dihydrocarbyl cresol used in the organic compositions should be enough to provide the desired degree of antioxidant protection when used with the dialkyl tin sulfide. In general, from about 0.05 to 5 weight percent of the phenolic antioxidant provides adequate protection. A more preferred range is from about 0.05 to 3 weight percent of the phenolic antioxidant.

Generally, less of the dialkyl tin sulfide is used than phenolic antioxidant, although this is not a requirement but is dictated by economics. Only a synergistic amount is required. Synergistic results can be obtained with as little as 0.001 of the dialkyl tin sulfide. A useful range is from about 0.001 to 3 weight percent of the dialkyl tin sulfide. In most cases it is preferred to use from 0.005 to 1 weight percent of dialkyl tin sulfide.

The synergistic compositions of this invention can be used in a wide range of organic materials normally susceptible to degradation in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyllead antiknock fluid which contains ethylenedichloride and ethylenedibromide.

The additives of this invention are effective in stabilizing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some examples are acrylic rubber, butadiene-styrene rubber (SBR), polychloroprene, chlorosulfonated polyethylene, fluorocarbon rubbers, isobutyleneisoprene (IIR), polyisoprene, poly - cis - butadiene, nitrile-butadiene rubber, polyisobutylene rubber, polysulfide rubbers, silicone rubbers, polyurethanes, India rubber, reclaimed rubber, balata rubber, gutta percha rubber, and the like. Both natural rubber and synthetic rubbers such as neoprene, SBR rubber, EPT rubber, GR–N rubber, chloroprene rubber, polyisoprene rubber, EPR rubber, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The compounds of this invention are superior antioxidants for high molecular weight polyolefins such as polypropylene (both high pressure and so-called Ziegler type polypropylene), polybutene, polybutadiene (both cis and trans), and the like.

One of the features of the present stabilizers is that they do not cause discoloration when used in transparent, white, or light-colored organic materials such as white rubber or plastics such as polyethylene, polypropylene, and the like.

The following examples serve to illustrate the use of the stabilizers of the present invention in stabilizing some representative organic materials normally subject to deterioration in the presence of oxygen or ozone.

EXAMPLE 13

A rubber stock is prepared containing the following components.

| Component: | Parts |
| --- | --- |
| Pale crepe rubber | 100 |
| Zinc oxide filler | 50 |
| Titanium dioxide | 25 |
| Stearic acid | 2 |
| Ultramarine blue | 0.12 |
| Sulfur | 3.00 |
| Mercaptobenzothiazole | 1.00 |

To the above base formula is added one part by weight of α-methyl-2,6-di-tert-butyl-p-cresol and 0.01 part by weight of di-n-propyl tin sulfide, and following this, individual samples are cured for 20, 30, 45 and 60 minutes, respectively, at 274° C. After cure, all of these samples remain white in color and possess excellent tensile strength. Furthermore, they are resistant to degradation caused by either oxygen or ozone on aging.

EXAMPLE 14

A synthetic rubber master batch comprising 100 parts of SBR rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared. To this is added 1.5 parts of α-butoxy-2,6-dicyclohexyl-p-cresol and 0.05 part of dimethyl tin sulfide. This composition is then cured for 60 minutes employing 45 p.s.i.g. of steam pressure. The resulting synthetic rubber possesses resistance to oxygen and ozone induced degradation.

EXAMPLE 15

A butadiene acrylonitrile copolymer is prepared from 68 percent 1,3-butadiene and 32 percent acrylonitrile. Two percent, based on the weight of the copolymer, of α-dodecyloxy-4,6-di-tert-amyl-o-cresol and 0.1 percent of di-n-octyl tin sulfide are added as an aqueous emulsion to the latex obtained from emulsion copolymerization of the butadiene and acrylonitrile monomers. The latex is coagulated with aluminum sulfate and the coagulum, after washing, is dried for 20 hours at 70° C. The synthetic copolymer so obtained is resistant to oxidative degradation.

EXAMPLE 16

Three percent of α-eicosyloxy-4-methyl-6-(α-methylbenzyl)-o-cresol and di-n-butyl tin sulfide as an emulsion in sodium oleate is added to a rubber-like copolymer of 1,3-butadiene and styrene containing 25 percent styrene. The resulting synthetic elastomer possesses enhanced stability.

EXAMPLE 17

To a master batch of GR-N synthetic rubber containing 100 parts of GR-N rubber, 5 parts of zinc stearate, 50 parts of carbon black, 5 parts of road tar, 2 parts of sulfur and 2 parts of mercaptobenzothiazole is added 5 percent, based on weight, of α-triacontyloxy-2,6-di-isopropyl-p-cresol and 0.5 percent of di-sec-hexyl tin sulfide. After curing, a synthetic rubber is obtained of improved oxidative stability.

EXAMPLE 18

To a master batch of polyethylene having an average molecular weight of 1,000,000, a tensile strength of 6,700 p.s.i., a Shore D hardness of 74 and a softening temperature under low load of 150° C., is added 0.5 percent of α-pentacontyloxy-2-methyl-6-sec-eicosyl-p-cresol and 0.01 percent of di-sec-hexyl tin sulfide. The resulting polyethylene possesses stability against oxidative degradation and shows little tendency to yellow after extensive aging.

EXAMPLE 19

A linear polyethylene having a high degree of crystallinity (93 percent), and less than one branched chain per 100 carbon atoms, a density of about 0.96 gram per ml and which has about 1.5 double bonds per 100 carbon atoms, is mixed with 0.05 weight percent of α-decyloxy - 2-methyl-6-(α,α-dimethylbenzyl)-p-cresol and 0.1 weight percent of di-(2-ethylhexyl) tin sulfide. The resulting polyethylene is found to possess stability against oxidative degradation.

EXAMPLE 20

To 100 parts of an ethylenepropylene 1,5-cyclooctadiene terpolymer is added 3 parts of α-octadecyloxy-4,6-di-(4-n-dodecylcyclohexyl)-o-cresol and 0.1 part of diisopropyl tin sulfide, resulting in an ethylenepropylene diene terpolymer of enhanced stability.

EXAMPLE 21

To 100 parts of an ethylenepropylene rubber is added 2 parts of the liquid phenolic antioxidant of Example 1 and 0.025 part of di-sec-butyl tin sulfide, resulting in an EPR rubber stock of improved stability.

EXAMPLE 22

After the polymerization of polypropylene in a hexane solvent employing a diethyl aluminum chloride-titanium trichloride catalyst, the catalyst is neutralized with water and the liquid antioxidant of Example 5 and di-n-butyl tin sulfide is added to the mixture in quantities such that, after evaporation of the solvent, a Ziegler type polypropylene is obtained containing 2 percent of the liquid phenolic antioxidant and 0.07 weight percent of di-n-butyl tin sulfide. This polypropylene is found to possess excellent stability against degradation caused by oxygen or ozone. Furthermore, this polypropylene is found to resist degradation at elevated temperatures, even in the presence of oxygen. During this high temperature aging the polypropylene shows no tendency to discolor.

EXAMPLE 23

To 1,000 parts of a gasoline containing 26.6 percent aromatics, 20.8 percent olefins, 52.6 percent saturates and having an API gravity of 62.1 is added 10 parts of the liquid antioxidant of Example 3 and 1 part of di-n-hexyl tin sulfide. The resulting gasoline is stable.

EXAMPLE 24

To 10,000 parts of gasoline containing 8.6 percent aromatics, 7.9 percent olefins, 83.5 percent saturates and having an API gravity of 68.5 is added 200 parts of the antioxidant of Example 4 and 50 parts of diethyl tin sulfide. The resulting gasoline is stable against oxidative degradation.

EXAMPLE 25

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 300 parts of the antioxidant of Example 11 and 3 parts of di-n-octyl tin sulfide. The resulting gasoline containing a manganese antiknock was resistant to oxidative degradation.

EXAMPLE 26

To 10,000 parts of a gasoline containing 20.5 percent aromatics, 32.9 percent olefins and 46.6 percent saturates and containing 2.39 grams per gallon of tetraethyllead and one theory of chlorine as ethylenedichloride and 0.5 theory of bromine as ethylenedibromide is added 500 parts of α-propoxy-2,6-di-sec-octyl-p-cresol and 10 parts of di-sec-heptyl tin sulfide. The resulting gasoline containing a lead antiknock and halogen scavenger is resistant to oxidative degradation.

EXAMPLE 27

To 10,000 parts of gasoline containing 38.1 percent aromatics, 7.3 percent olefins and 54.6 percent saturates and which contains 3.17 grams per gallon of lead as tetramethyllead, one theory of chlorine as ethylenedichloride, 0.5 theory of bromine as ethylenedibromide and 0.2 theory of phosphorus as tris(β-chloroisopropyl)thionophosphate is added 50 parts of α-methoxy-2-methyl-6-(α-methyl-4-sec-dodecylbenzyl)-p-cresol and 50 parts of di-n-butyl tin sulfide. The resulting gasoline is resistant to degradation.

EXAMPLE 28

An antiknock fluid composition is prepared by mixing together 61.5 parts of tetraethyllead, 17.9 parts of ethylenedibromide, 18.8 parts of ethylenedichloride and 1.3 parts of α-tetracontyloxy-4,6-di-sec-eicosyl-o-cresol and 0.5 part of di-sec-butyl tin sulfide, resulting in a stable antiknock fluid composition.

EXAMPLE 29

To 1,000 parts of a commercial diesel fuel having a cetane number of 42, is added 5 parts of amyl nitrate and 4 parts of α-decyloxy-2,6-di-tert-butyl-p-cresol and 1 part of diethyl tin sulfide, resulting in a diesel fuel of high resistance to oxidative deterioration which does not form gum or sludge on storage.

EXAMPLE 30

To 1,000 parts of a solvent-refined neutral oil (95 viscosity index and 200 SUS at 100° F.) containing 6 percent of a commercial methacrylate type V.I. improver is added 5 weight percent of a solution of 10 weight percent di-n-butyl tin sulfide and 90 weight percent of the liquid antioxidant of Example 1, resulting in a stable lubricating oil.

EXAMPLE 31

To a solvent-refined crankcase lubricating oil having a viscosity index of 95 and a SAE viscosity of 10 is added 0.1 weight percent of α-methoxy-2,6-di-tert-butyl-p-cresol and 0.005 weight percent of di-propyl tin sulfide. The resulting oil was stable against oxidative degradation.

EXAMPLE 32

To 100,000 parts of a petroleum hydrocarbon oil having a gravity of 30.3° API at 60° F., viscosity of 178.8 SUS at 100° F., a viscosity index of 154.2, and containing 1,000 parts of the reaction product of an alkenyl succinic anhydride where the alkenyl group has a molecular weight of 1,000, with tetraethylenepentamine, is added 200 parts of the liquid product of Example 5 and 10 parts of di-n-hexyl tin sulfide. The resulting lubricating oil possesses excellent dispersancy and is resistant to oxidative degradation.

EXAMPLE 33

To 100,000 parts of a pentaerythritol ester of a mixture of $C_{5-9}$ monocarboxylic fatty acids is added 400 parts of the liquid phenolic antioxidant of Example 1 and 1 part of di-n-butyl tin sulfide. The resulting synthetic lubricating oil possesses improved resistance against oxidative deterioration.

EXAMPLE 34

To 100,000 parts of dioctyl sebacate having a viscosity at 210° F. of 36.7 SUS and a viscosity index of 159, is added 250 parts of α-methoxy-2,6-di-(α-methylbenzyl)-p-cresol and 10 parts of di-n-octyl tin sulfide, resulting in a synthetic diester lubricating oil having improved resistance to oxidative degradation.

EXAMPLE 35

To 1,000 parts of a commercial coconut oil is added 5 parts of α-ethoxy-2,6-diisopropyl-p-cresol and 0.1 part of dimethyl tin sulfide, resulting in a vegetable oil with good aging characteristics.

EXAMPLE 36

To 100,000 parts of lard is added 100 parts of α-eicosyloxy-4,6-di-sec-octadecyl-o-cresol and 0.05 part of di-n-decyl tin sulfide, resulting in a lard having resistance to rancidity.

The synergistic combinations of this invention are very useful in stabilizing lubricating oils such as the synthetic ester lubricants and hydrocarbon lubricating oils. They have been found to be most useful in stabilizing hydrocarbon lubricating oils. Tests have been carried out to demonstrate their effectiveness in this use. These were Polyveriform Tests in which air was bubbled through a heated hydrocarbon lubricating oil sample at a rate of 48 liters per hour over a 48-hour period. The oil sample contained 0.1 weight percent lead bromide and also a weighed copper-lead engine bearing. Test criteria was (1) increase in acid number, (2) increase in viscosity, and (3) bearing weight loss. Each of these is a sign of oil breakdown. The results obtained at 300° F. using the product of Example 1 and dibutyl tin sulfide (DBTS) are shown in the following table.

| Additive | Conc., percent | Bearing wt. loss, mg. | Increase in acid No. | Viscosity, increase percent |
|---|---|---|---|---|
| 1.... None | | >100 | >10 | >100 |
| 2.... Example 1 | 0.5 | 170 | 8.3 | 87 |
| 3.... {Example 1 | 0.5 } | 8 | 0.1 | 11 |
| {Plus DBTS [1] | 0.012 } | | | |

[1] Dibutyl tin sulfide.

As the above results show, the addition of but a very small amount of the dialkyl tin sulfide greatly enhances the performance of the α-alkoxy-p-cresol.

What is claimed is:

1. Organic material normally susceptible to oxidative deterioration containing an antioxidant amount of a phenolic antioxidant and a synergistic amount of a dialkyl tin sulfide, said phenolic antioxidant having the formula:

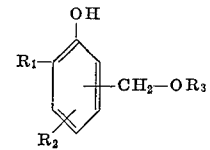

wherein $R_1$ is selected from the group consisting of alpha-branched alkyl radicals containing 3–20 carbon atoms, cycloalkyl radicals containing 6–20 carbon atoms and alpha-branched aralkyl radicals containing 8–20 carbon atoms, $R_2$ is selected from the group consisting of alkyl radicals containing 1–20 carbon atoms, cycloalkyl radicals containing 6–20 carbon atoms and aralkyl radicals containing 7–20 carbon atoms, and $R_3$ is an alkyl radical containing from 1 to about 50 carbon atoms.

2. A composition of claim 1 wherein said organic material is a lubrication oil.

3. A composition of claim 1 wherein said phenolic antioxidant has the formula:

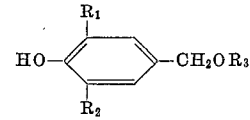

wherein $R_1$, $R_2$ and $R_3$ are the same as in claim 1.

4. A composition of claim 3 wherein said organic material is a lubricating oil.

5. A composition of claim 3 wherein said dialkyl tin sulfide is dibutyl tin sulfide.

6. A composition of claim 5 wherein said organic material is a lubricating oil.

7. A composition of claim 1 wherein said phenolic antioxidant is a normally liquid mixture of α-alkoxy-3,5-dialkyl-p-cresols, said mixture consisting essentially of compounds having the formula:

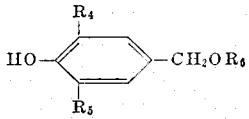

wherein $R_4$ and $R_5$ are tert-alkyl radicals and $R_6$ is an alkyl radical containing from about 8–14 carbon atoms in proportion such that from 0–5 weight percent are octyl radicals, from 40–85 weight percent are decyl radicals, from 10–50 weight percent are dodecyl radicals, and from 0–5 weight percent are tetradecyl radicals and at least 50 weight percent of said octyl, decyl, dodecyl and tetradecyl radicals, collectively, are linear primary alkyl radicals.

8. A composition of claim 7 wherein $R_4$ and $R_5$ are tert-butyl radicals.

9. A composition of claim 8 wherein said dialkyl tin sulfide is dibutyl tin sulfide.

10. A composition of claim 9 wherein said organic material is a lubricating oil.

References Cited

UNITED STATES PATENTS

| | | | |
|---|---|---|---|
| 2,954,345 | 9/1960 | Filbey | 252—52 |
| 3,077,451 | 2/1963 | Antler | 252—46.4 |
| 3,211,652 | 10/1965 | Hinkamp | 252—52 |
| 3,236,772 | 2/1966 | Younghouse et al. | 252—42.7 |

D. E. WYMAN, Primary Examiner

W. H. CANNON, Assistant Examiner

U.S. Cl. X.R.

252—52, 400; 99—163; 260—45.75; 44—68